United States Patent
Suzuki

(10) Patent No.: US 7,726,817 B2
(45) Date of Patent: Jun. 1, 2010

(54) PROJECTOR WITH LAMP UNIT HAVING A U-SHAPED INSERTION FRAME

(75) Inventor: Masakazu Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 697 days.

(21) Appl. No.: 11/730,513

(22) Filed: Apr. 2, 2007

(65) Prior Publication Data

US 2007/0229773 A1 Oct. 4, 2007

(30) Foreign Application Priority Data

Apr. 3, 2006 (JP) ............................. 2006-101797

(51) Int. Cl.
*G03B 21/18* (2006.01)
*G03B 21/14* (2006.01)
(52) U.S. Cl. ........................................ 353/61; 353/119
(58) Field of Classification Search .................. 353/57, 353/58, 60, 61, 119; 349/5–9
See application file for complete search history.

(56) References Cited

U.S. PATENT DOCUMENTS

| | | | | |
|---|---|---|---|---|
| 6,494,581 B2 * | 12/2002 | Shimizu | ...................... | 353/61 |
| 6,558,003 B2 * | 5/2003 | Mihara | ........................ | 353/52 |
| 7,367,679 B2 * | 5/2008 | Emery | .......................... | 353/60 |
| 7,380,965 B2 * | 6/2008 | Nakashita | .................... | 362/373 |
| 7,441,904 B2 * | 10/2008 | Fuse et al. | ..................... | 353/61 |
| 7,591,571 B2 * | 9/2009 | Takeda | ........................ | 362/373 |
| 2004/0263799 A1 | 12/2004 | Lim | | |
| 2008/0117389 A1 * | 5/2008 | Hamada | ..................... | 353/119 |
| 2009/0027627 A1 * | 1/2009 | Noda | .......................... | 353/61 |

FOREIGN PATENT DOCUMENTS

EP 1093013 A1 4/2001
JP 07-295097 11/1995

* cited by examiner

*Primary Examiner*—Georgia Y Epps
*Assistant Examiner*—Pascal M Bui-Pho
(74) *Attorney, Agent, or Firm*—Pillsbury Winthrop Shaw Pittman, LLP

(57) ABSTRACT

This projector includes a lamp unit and a lamp unit housing unit. The lamp unit housing unit includes a substantially U-shaped insertion frame. And the lamp unit includes a lamp and a frame. Furthermore, the lamp unit includes an edge and a plate on the outside of the frame. The edge is a member which contacts against the end portion of the insertion frame in the exhaust direction, in the installed state in which the lamp unit is installed to the lamp unit housing unit. And the plate is a member which, in the installed state, contacts in the exhaust direction with its end edge portion against an installation surface formed upon the insertion frame. Moreover, in the installed state, the plate contacts in the engagement direction with its end edge portion against the aperture line which connects the two ends of the insertion frame.

3 Claims, 18 Drawing Sheets

PROJECTOR WITH LAMP UNIT HAVING A U-SHAPED INSERTION FRAME

CROSS REFERENCE

This Nonprovisional application claims priority under 35 U.S.C. §119(a) on Patent Application No. 2006-101797 filed in Japan on Apr. 3, 2006, the entire contents of which are hereby incorporated by reference.

BACKGROUND OF THE INVENTION

The present invention relates to a projector in which a cover for lamp unit exchange, which is fixed to a chassis of the projector, may be removed for exchange of the lamp unit.

Projectors are per se known in the prior art, and are widespread, which irradiate light from a lamp upon an image display device, thus projecting an image displayed on this image display device upon a screen. This image display device may be a digital micro mirror device (DMD) or a liquid crystal display device.

This type of prior art projector comprises a projector chassis, a lamp door which can be fitted to the chassis and removed therefrom, a lamp unit which comprises a lamp, a fan which blows air into the lamp unit, and a lamp housing unit for installation of the lamp unit. This lamp unit housing unit is formed within the chassis of the projector, as a partitioned off storage space.

The lamp becomes hot due to emission of light. Due to this, in the above described projector according to the prior art, the lamp has been cooled by blowing air into the lamp unit with the fan. And the air which is to be exhausted after having air cooled the lamp is discharged to the exterior of the lamp unit housing unit from an exhaust aperture. This exhaust which is discharged from the exhaust aperture to the exterior of the lamp unit housing unit is then discharged to the exterior of the chassis by another fan.

It should be understood that, as a heat dissipation mechanism for such a projector, a mechanism in which fans are provided both before and after the light source is disclosed in Japanese Laid-Open Patent Publication Heisei 7-295097.

With a prior art type projector, in the state in which the lamp unit is installed to the lamp unit housing unit, sometimes air at high temperature leaks out from a gap at the junction portion between the lamp unit and the lamp unit housing unit. Due to this, sometimes heat has become trapped within the lamp unit housing unit described above, because of this escape of air at high temperature. As a result, sometimes the temperature within the lamp unit housing unit has become undesirably elevated. When the temperature within the lamp unit housing unit becomes high, the cooling efficiency of the lamp is deteriorated, which is not desirable.

Accordingly, there have been the problems of decrease of the light emission efficiency of the lamp, and of the life of the lamp becoming shorter. Furthermore, due to application of this undue heat to a lamp door made from resin provided in the neighborhood of the lamp unit, there has also been a fear that this lamp door may be softened and deformed.

The object of the present invention is to provide a projector which has a structure in which it is ensured that air at high temperature does not leak out from any gap at the joining portion between the lamp unit and the lamp housing unit.

SUMMARY OF THE INVENTION

The projector according to the present invention includes a lamp unit and a lamp unit housing unit.

The lamp unit includes a lamp which constitutes a light source, and a frame. The frame is formed around the periphery of a first exhaust aperture of the lamp unit, for exhausting air which has been taken into the interior of the lamp unit and has passed the lamp. With this structure, the lamp is cooled by this air as it passes the lamp. Thus, the air which is exhausted after having performed this air cooling has been raised to a high temperature.

And the lamp unit housing unit is provided within a chassis of the projector, constitutes a partitioned-off housing space within the chassis. Moreover, the lamp unit housing unit has an installation surface upon its inner wall for installing the lamp unit.

The lamp unit housing unit includes a substantially U-shaped insertion frame which is formed around the periphery of a second exhaust aperture provided upon the installation surface. This second exhaust aperture is for exhausting the air entering through the first exhaust aperture when the lamp unit is installed.

With the structure described above, when the frame is engaged to the insertion frame from both ends of the U-shape of the insertion frame of the lamp unit housing unit, the projector is put into its installed state in which the lamp unit is installed to the lamp unit housing unit.

And the lamp unit includes, on the outside of the frame, an edge and a plate which satisfy the two conditions (1) and (2) below. Due to this, in the installed state, the leakage of air at high temperature out from a gap at the junction portion between the lamp unit and the lamp unit housing unit is prevented.

(1) The edge is a member which, in the installed state, contacts against the end portion of the insertion frame in the exhaust direction.

(2) The plate is a member which, in the installed state, contacts in the exhaust direction with its end edge portion against the installation surface formed upon the insertion frame. Moreover, in the installed state, the plate contacts in the engagement direction with its end edge portion against the aperture line which connects the two ends of the insertion frame.

DETAILED DESCRIPTION OF THE INVENTION

In the following, projectors according to various embodiments of the present invention will be explained.

Figure 1:
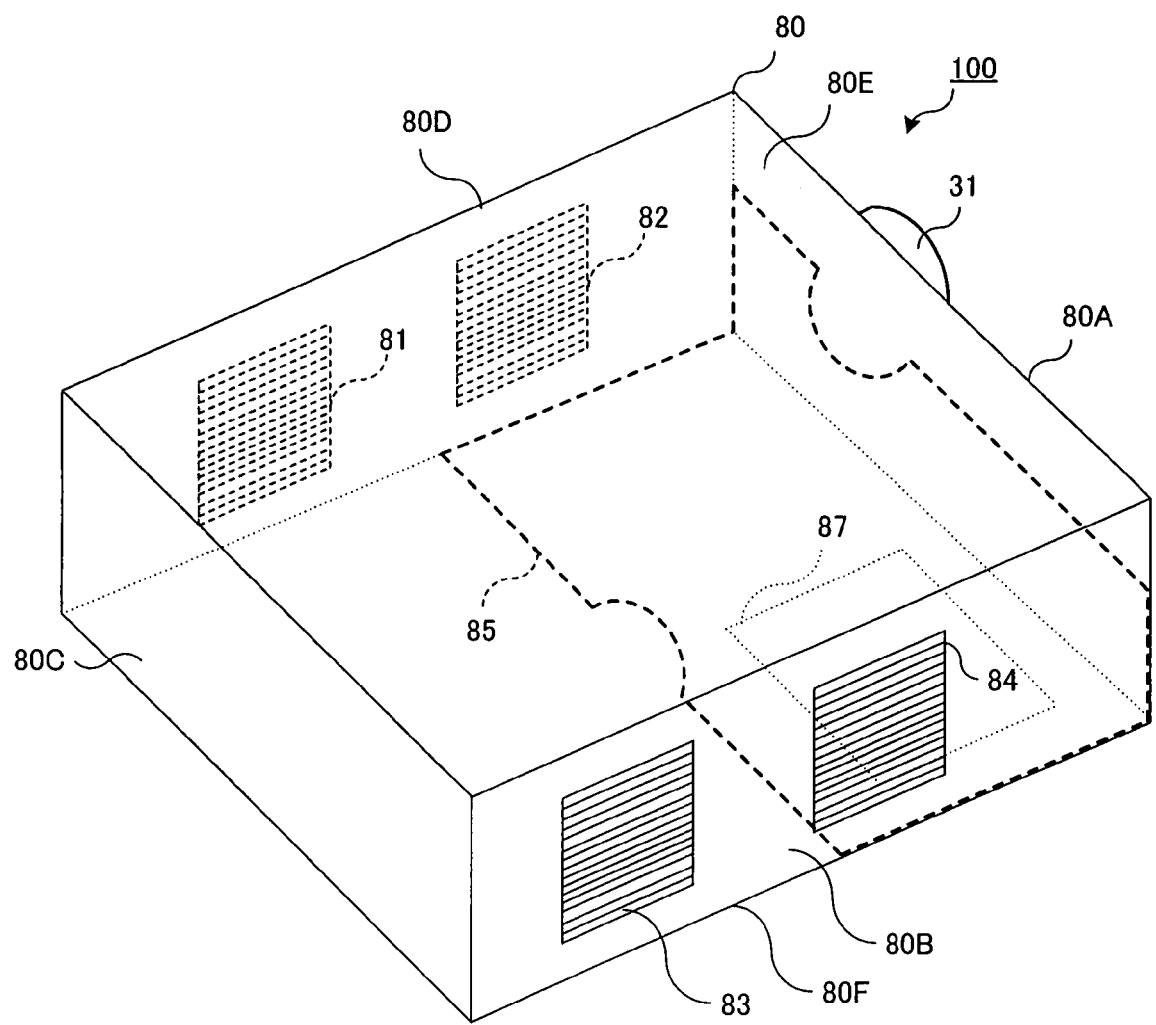
FIG. 1 is a figure showing the external appearance of a projector according to an embodiment of the present invention.

FIG. 1 is a figure showing the external appearance of a projector according to an embodiment of the present invention. And FIG. 2 is a perspective view schematically showing the internal construction of this projector which is an embodiment of the present invention.

As shown in FIG. 1, the chassis (casing) 80 of the projector 100 comprises side plates 80A through 80D, a top plate 80E, and a bottom plate 80F. Furthermore, a lamp door 85 which can be fitted and removed from the chassis 80 is mounted to portions of the side plate 80A and the bottom plate 80F. Moreover, in the bottom plate 80F there is provided an opening portion 87, via which a lamp unit 10 can be exchanged.

A projection lens 31 is fitted in the side plate 80A. And intake apertures 81 and 82 are formed in the side plate 80D. These intake apertures 81 and 82 are for intake of external air into the interior of the chassis 80. Moreover, exhaust apertures 83 and 84 are formed in the side plate 80B. These exhaust apertures 83 and 84 are for exhausting air from the interior of the chassis 80.

Figure 2:
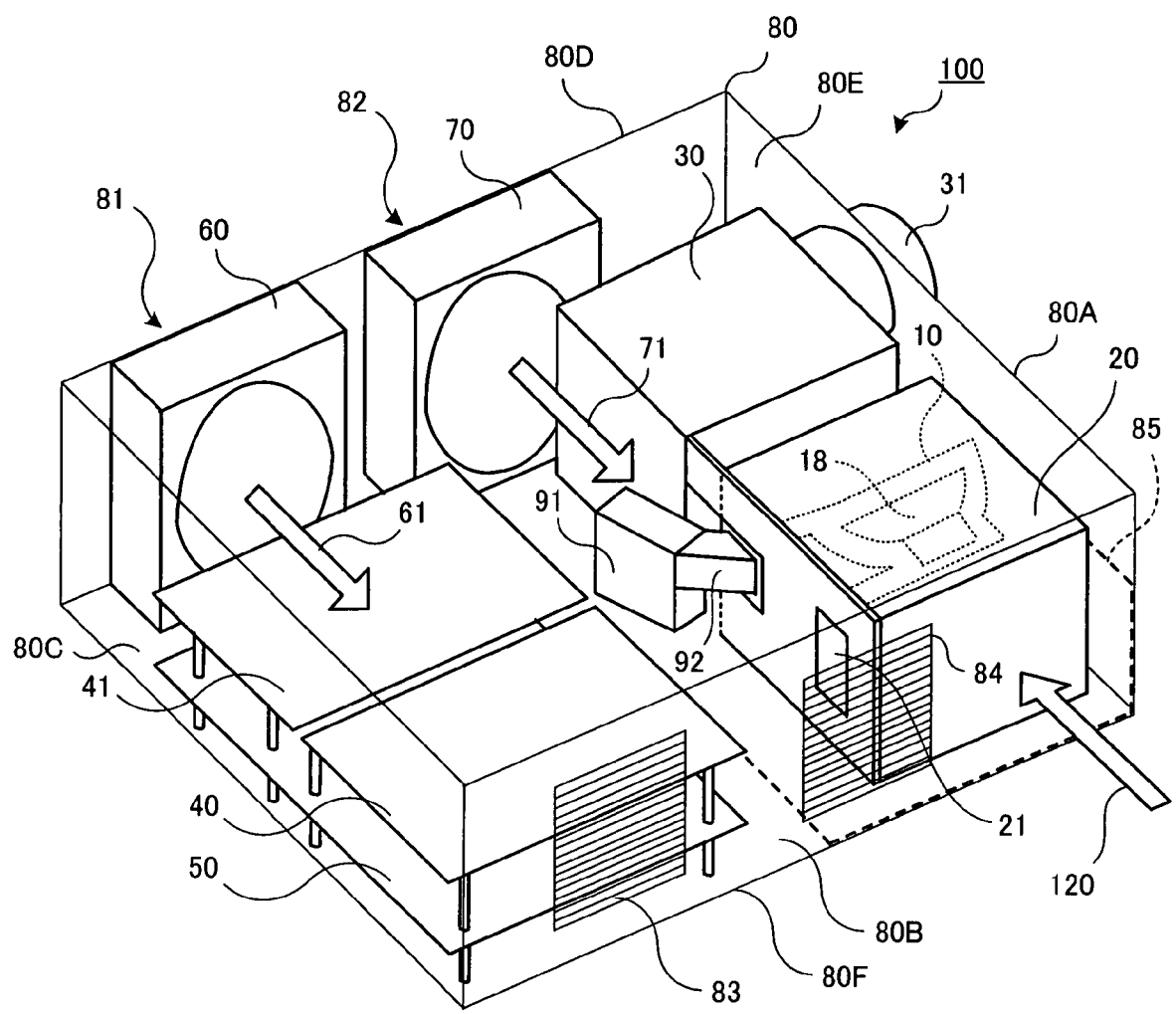
FIG. 2 is a perspective view schematically showing the internal construction of this projector according to an embodiment of the present invention.

As shown in FIG. 2, this projector 100 comprises a lamp housing unit 20, an image projection unit 30, the projection lens 31, a power supply board 40, another power supply board 41, a control board 50, the intake apertures 81 and 82, the exhaust apertures 83 and 84, a main fan 60, and another main fan 70. Each of these is fitted to the chassis 80.

The lamp unit 10 is stored within the lamp unit storage unit 20. This lamp unit 10 includes a lamp 18, which is a light source for image projection. The lamp unit 10 emits light from this lamp 18.

And the image projection unit 30 comprises an image display device such as a DMD or the like, and a color wheel, neither of which is shown in the figures. Using light emitted from the light unit 10, this image projection unit 30 projects an image formed by the image display device through the projection lens 31 to the exterior of the chassis 80. As a result, this image is projected upon a screen which hangs upon a wall, or the like.

The power supply boards 40 and 41 supply electrical power to the lamp unit 10 and so on. And the control board 50 controls the operation of the color wheel and the image display device and so on, provided to the unit 30.

The main fans 60 and 70 are propeller fans. These main fans 60 and 70 are fans for ventilating the interior of the chassis 80. And these main fans 60 and 70 are fitted in the respective air intake apertures 81 and 82. The main fans 60 and 70 suck in external air through the intake apertures 81 and 82, and exhaust this air through exhaust apertures 83 and 84 which are formed in the opposite side of the chassis 80. The interior of the main body of the projector 100 is air cooled in this manner.

It should be understood that, in FIG. 2, the direction of the air flow due to the main fans 60 and 70 is shown by the white arrow signs 61 and 71.

Figure 3A:
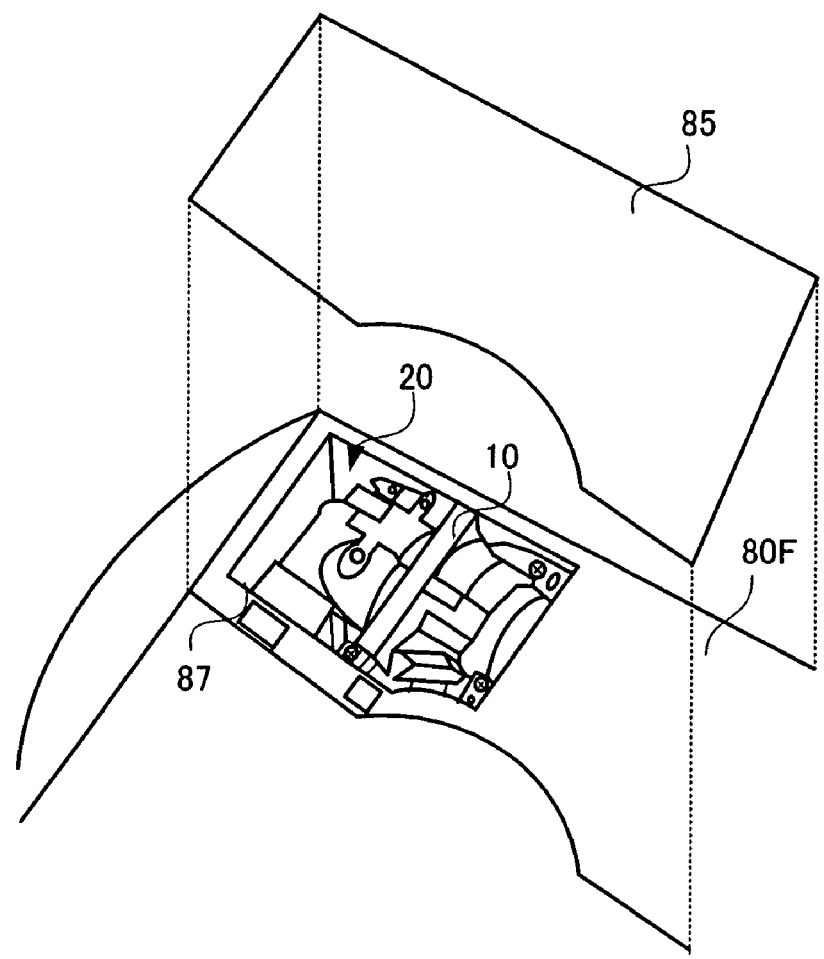
FIGS. 3A and 3B are figures respectively showing a state in which a lamp unit is housed in a lamp unit housing unit, and a state in which this lamp unit has been removed from the lamp unit housing unit.
Figure 3B:
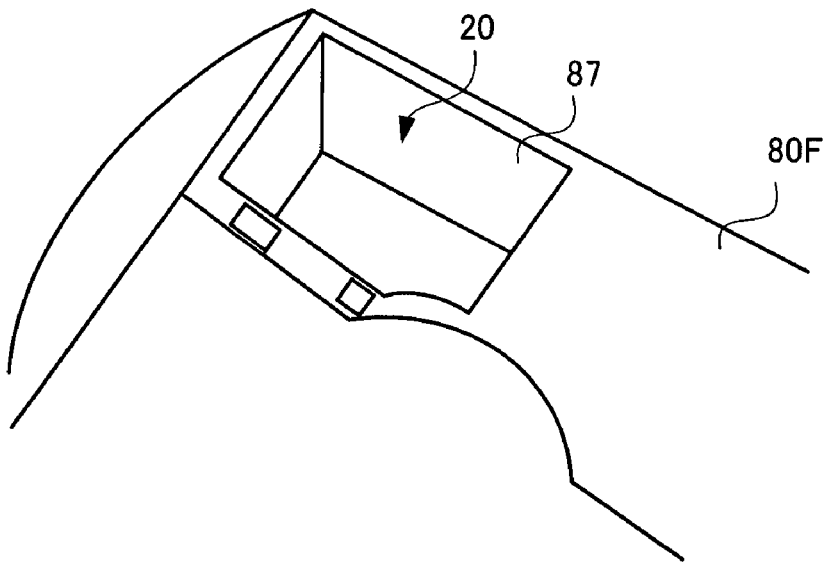

FIG. 3A is a figure showing a state in which the lamp unit 10 is housed in the lamp unit housing unit 20. And FIG. 3B is a figure showing a state in which the lamp unit 10 has been removed. This projector 100 has a structure in which the lamp unit 10 can be removed from, and replaced back into, the lamp unit housing unit 20 from the side of the bottom surface 80F of the main body of the projector 100. And this lamp unit housing unit 20 has a shape surrounded by four side plates and a single top plate. Moreover, in normal circumstances, a lamp door 85 which is made from resin is fitted to the bottom surface 80F of the projector 100, in order to close the lamp unit housing unit 20. Because of this, the lamp unit housing unit 20 constitutes a storage space, partitioned off within the chassis 80.

When the user removes this lamp door 85, then the lamp unit housing unit 20 is exposed, as shown in FIG. 3A. Furthermore, when he removes the lamp unit 10 from the lamp unit housing unit 20, then the interior of the lamp housing unit 20 constitutes a cavity, as shown in FIG. 3B.

By removing the lamp door 85 from the chassis 80 in this manner, the user is able to perform the task of exchanging the lamp unit 10 or the like in a simple manner.

Figure 4:
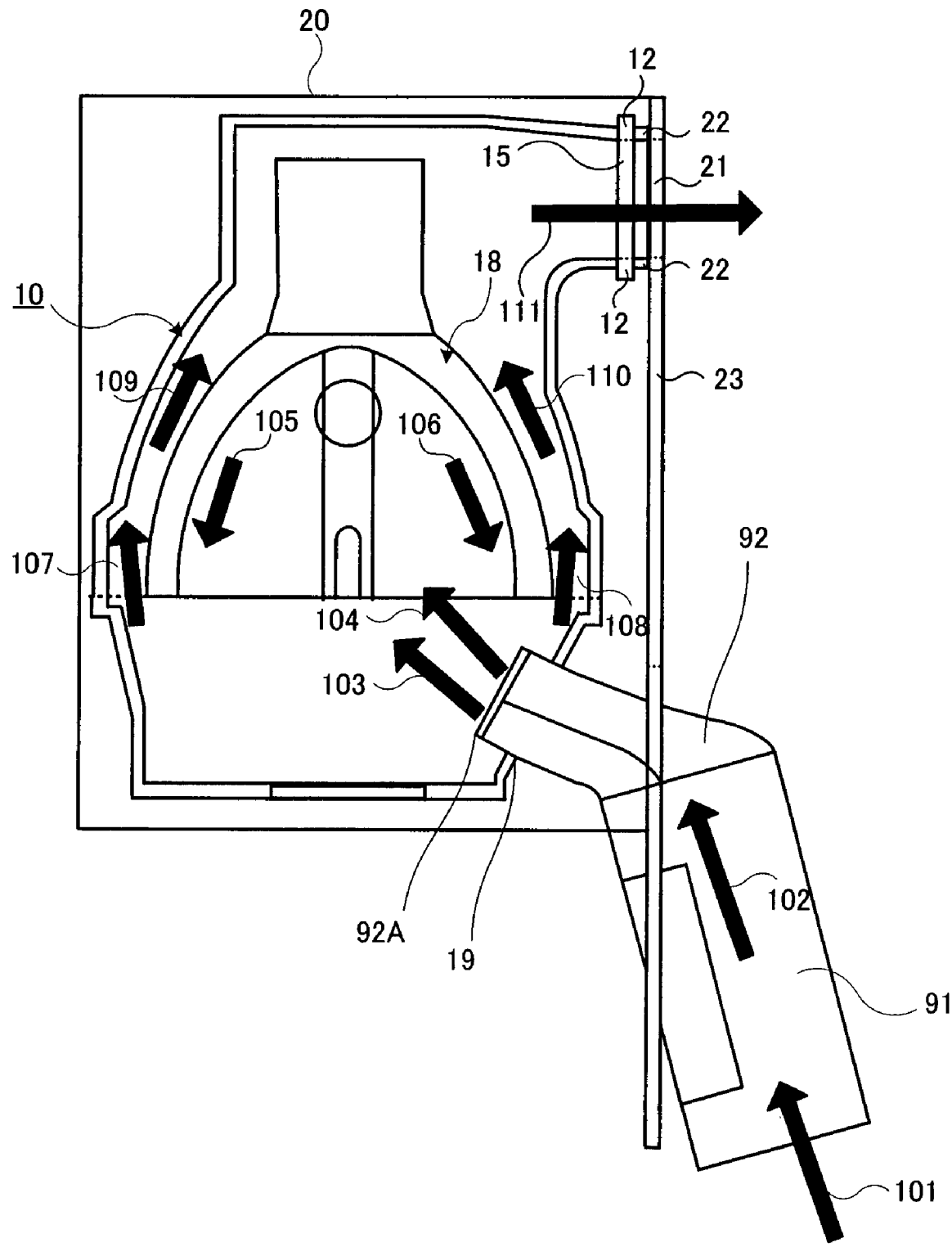
FIG. 4 is a cutaway plan view schematically showing the structure of the lamp unit.

FIG. 4 is a cutaway plan view schematically showing the structure of the lamp unit 10. This lamp unit 10 is housed in the lamp unit housing unit 20, as described above. The lamp unit is made from aluminum.

The lamp unit 10 comprises a lamp 18 which is a light source, an intake aperture 19 for admitting air for air cooling the lamp 18, and an exhaust aperture 15 for discharging air which has cooled the lamp 18. Furthermore, the exhaust aperture opens to an exhaust aperture 21 which is formed in the installation surface 23 of the lamp unit housing unit 20. A frame 12 is formed around the periphery of the exhaust aperture 15. And an insertion frame 22 is formed around the periphery of the exhaust aperture 21. Thus, the lamp unit 10 is installed to the lamp unit housing unit 20 by engaging the frame 12 of the lamp unit 10 to this insertion frame 22.

Furthermore, as shown in FIGS. 2 and 4, an intake fan 91 and a duct 92 are fitted to the lamp unit 10. The intake fan 91 is a sirocco fan. This intake fan 91 is connected to the duct 92. Moreover, the exhaust aperture 92A of the duct 92 is joined to the intake aperture 19 of the lamp unit 10. Yet further, the duct 92 and the intake aperture 19 of the lamp unit 10 are arranged in a configuration such that air is blown into the lamp 18.

With a structure such as that described above, cooling is performed by a flow of air as shown by the black arrow signs 101~111 in FIG. 4. First, the air which is sucked in by the intake fan 91 passes along the duct 92, and is blown in from the intake aperture 19 of the lamp unit 10 towards the lamp 18 in the interior of the lamp unit 10 (as shown by the black arrow signs 101~104). This air which has been blown in towards the lamp 18 cools the lamp 18. And the air which has been blown in towards the lamp 18 passes over the vicinity of the outer surface of the lamp 18 (as shown by the black arrow signs 105~106), then passes between the lamp unit 10 and the lamp 18, and is then exhausted from the exhaust apertures 15 and 21 (as shown by the black arrow signs 107~111). And the air which has thus been discharged from the exhaust aperture 21 is discharged to the exterior of the main body of the projector 100 by the main fans 60 and 70. This air has attained a high temperature, since it has served to air cool the lamp 18.

Figure 5:
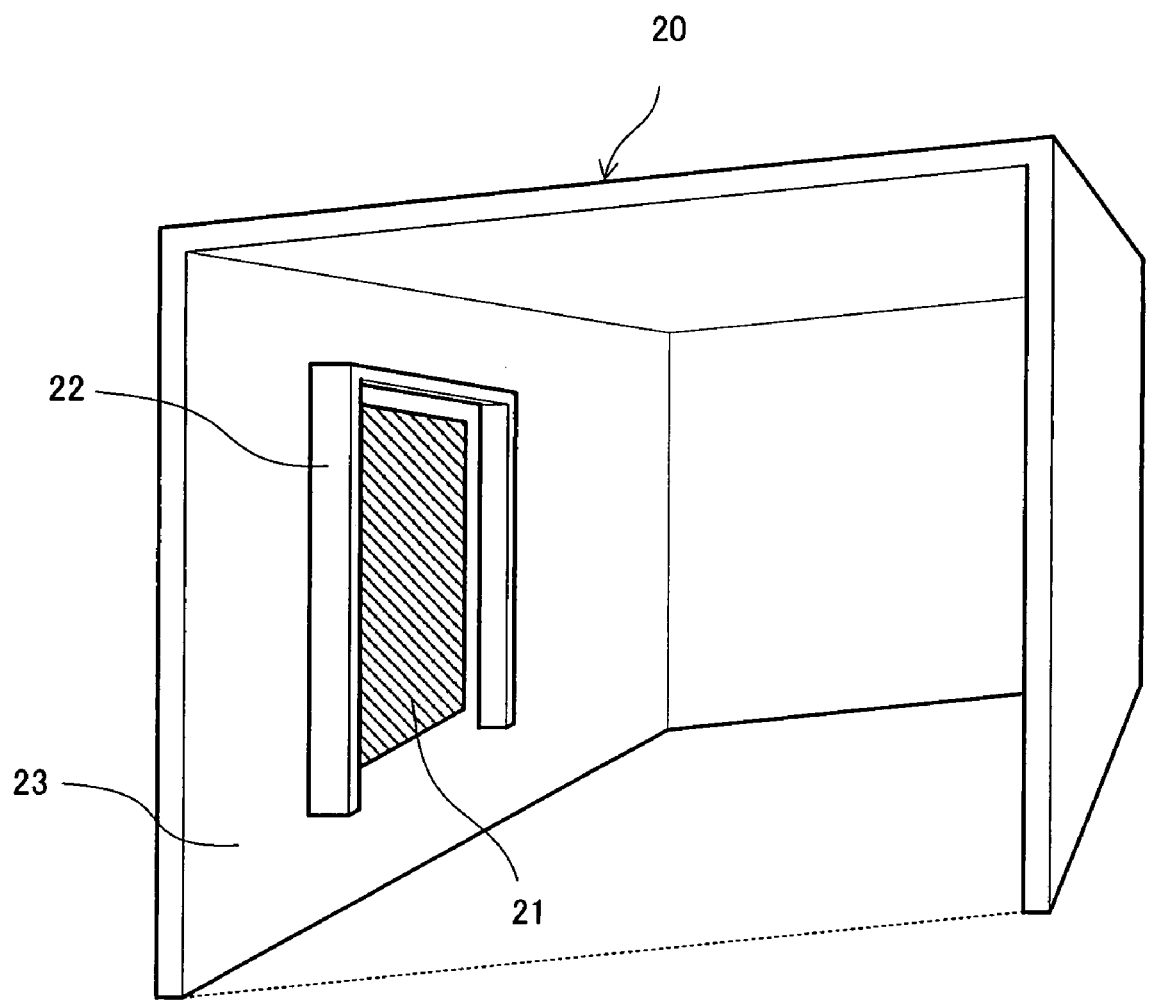
FIG. 5 is a perspective view showing the interior of the lamp unit housing unit 20 in its state with the lamp unit removed, as seen from the direction of the arrow sign 120 in FIG. 2.
Figure 6:
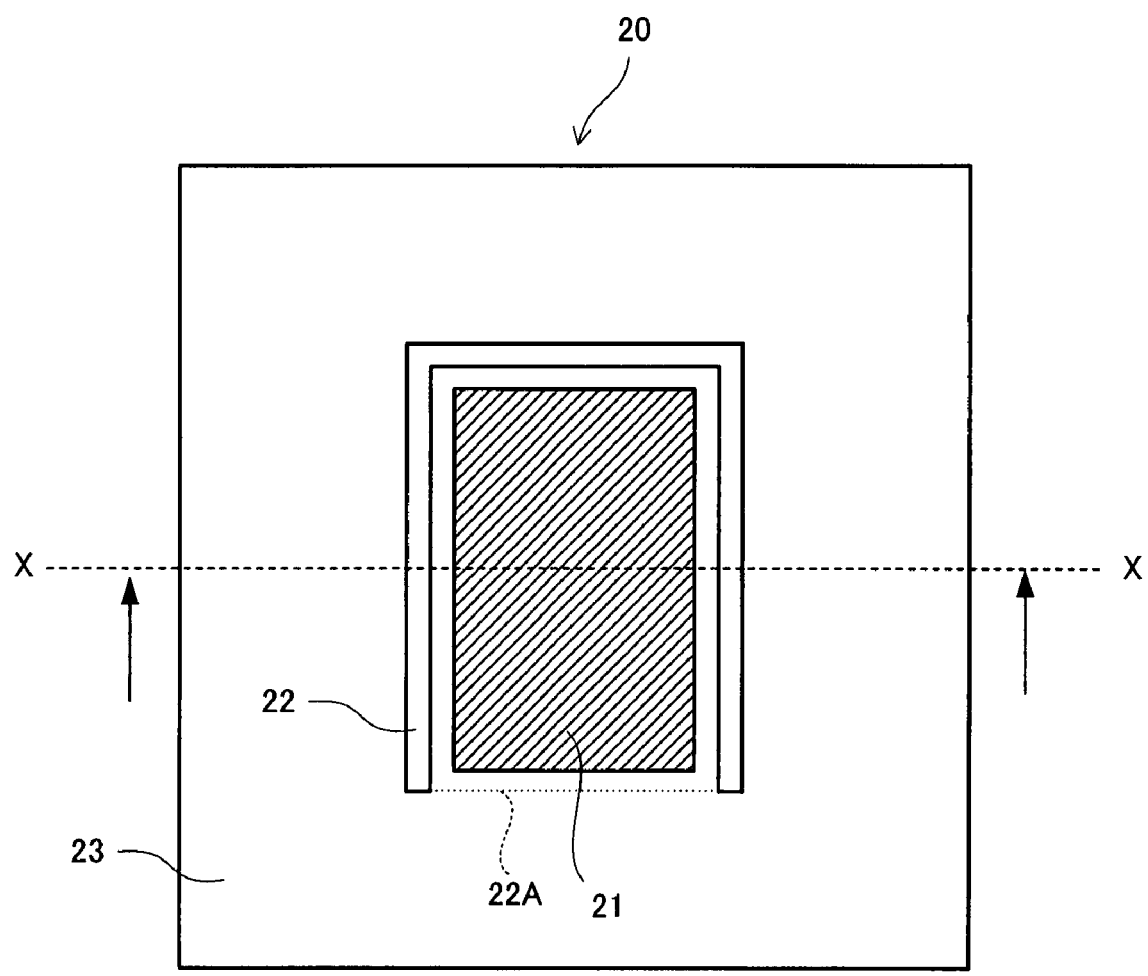
FIG. 6 is an elevation view of a surface upon which an insertion frame of the lamp unit housing unit is formed, in the state with the lamp unit having been removed.
Figure 7:
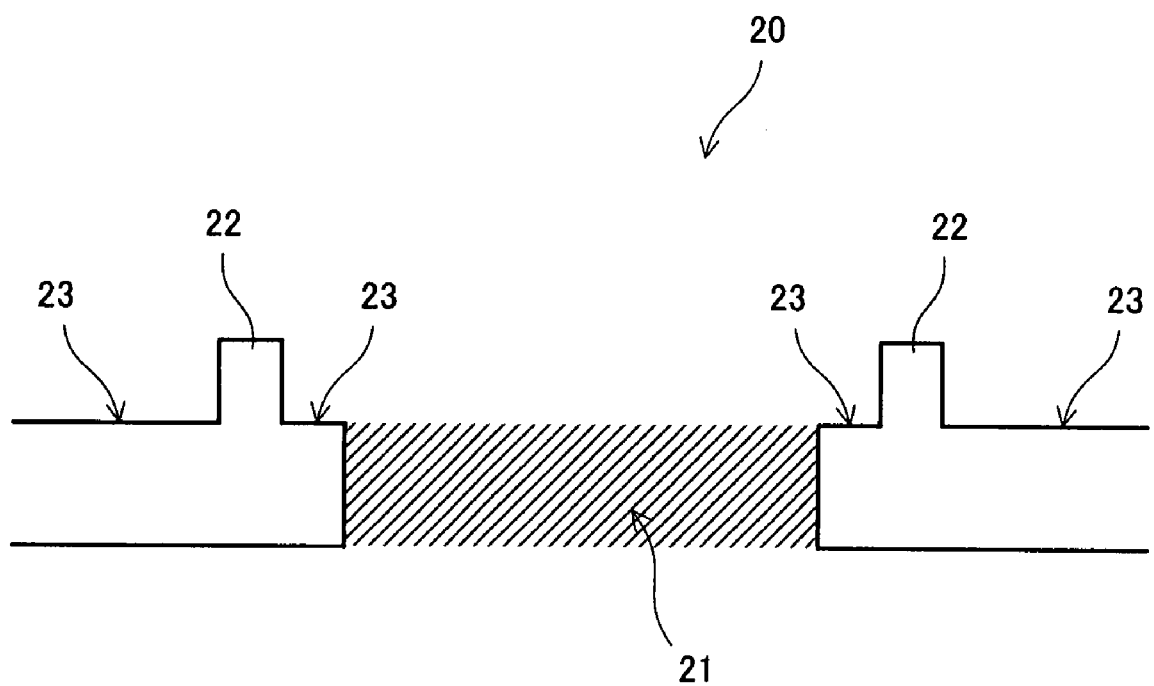
FIG. 7 is a sectional view of a relevant portion of FIG. 6, taken in a plane shown by the arrows X-X in that figure.

FIG. 5 is a perspective view showing the interior of the lamp unit housing unit 20 in its state with the lamp unit 10 removed, as seen from the direction of the arrow sign 120 in FIG. 2. And FIG. 6 is an elevation view of the surface upon which the insertion frame 22 of the lamp unit housing unit 20 is formed, in the state with the lamp unit 10 having been removed. Moreover, FIG. 7 is a sectional view of the relevant portion of FIG. 6, taken in a plane shown by the arrows X-X in that figure. In FIG. 5, the state is shown in which the side plate which faces towards the side plate 80B has been removed.

As shown in FIGS. 5 and 6, this lamp unit housing unit 20 comprises the insertion frame 22 which is substantially U-shaped, an installation surface 23 for installing the lamp unit 10, and the exhaust aperture 21 which is provided in the installation surface 23. The exhaust aperture 21 is formed in a position which opposes the exhaust aperture 15 of the lamp unit 10, when it is installed. Moreover, the insertion frame 22 is formed upon this installation surface 23. This insertion frame 22 is formed around the periphery of the exhaust aperture 21.

Now, with a projector according to the prior art, in the installed state in which the lamp unit has been installed to the lamp unit housing unit, sometimes air at high temperature has leaked from the gap between the frame of the lamp unit and the insertion frame of the lamp unit housing unit. Due to this, heat has become confined in the lamp housing unit due to this air at high temperature. And, as a result, the temperature within the lamp unit housing unit has sometimes become higher than is desirable.

Thus, in this embodiment, the structure is as follows.

Figure 8:
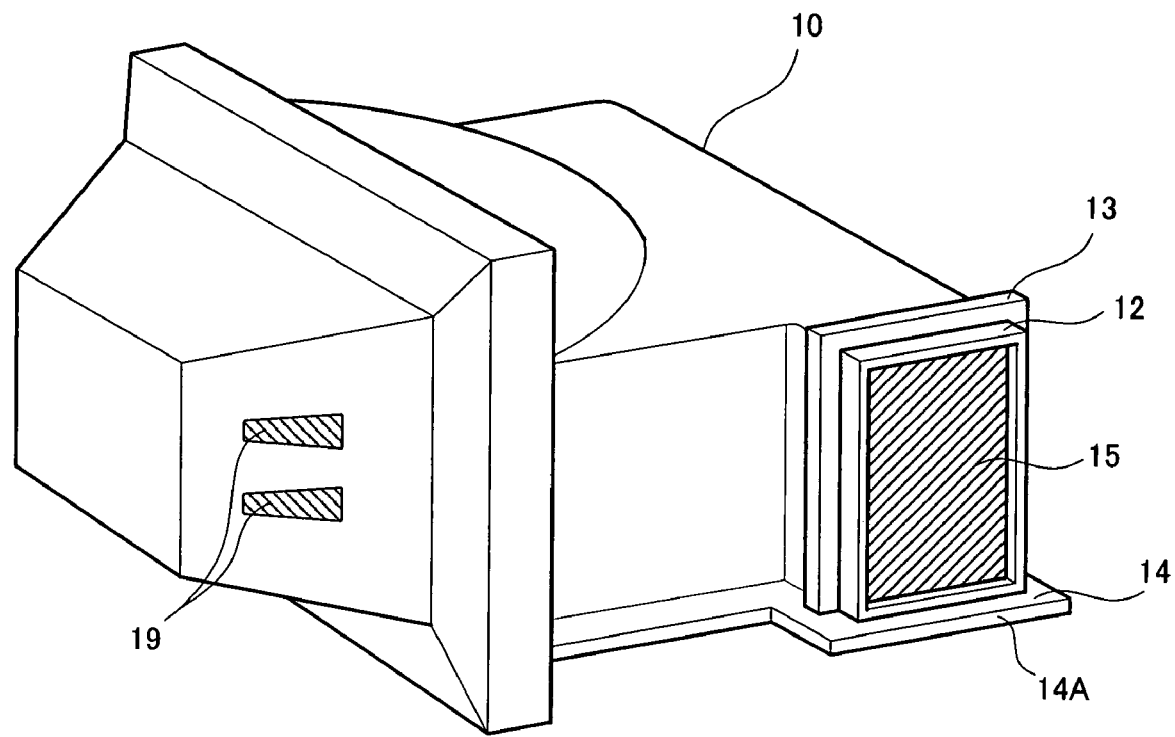
FIG. 8 is a figure showing the external appearance of the lamp unit.
Figure 9:
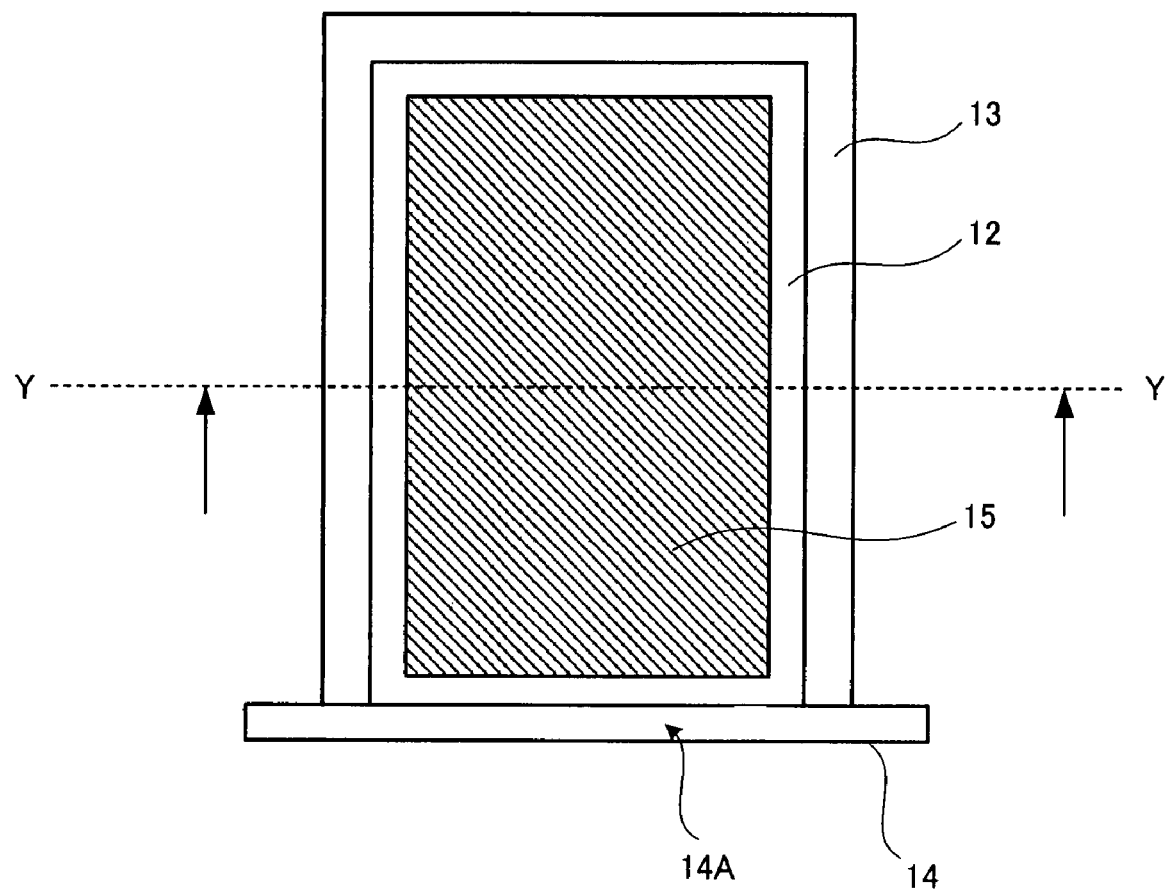
FIG. 9 is an elevation view of this lamp unit at a portion thereof at which a main frame is formed.

FIG. 8 is a figure showing the external appearance of the lamp unit 10. And FIG. 9 is an elevation view of a portion thereof at which the lamp unit frame 12 is formed. Moreover, FIG. 10 is a sectional view of the relevant portion of FIG. 9, taken in a plane shown by the arrows Y-Y in that figure.

As shown in FIG. 8, this lamp unit 10 comprises the intake aperture 19 for intake of cooling air, the exhaust aperture 15 for discharge of air which has cooled the lamp 18, and the frame 12 which is formed around the periphery of the exhaust aperture 15.

Figure 10:
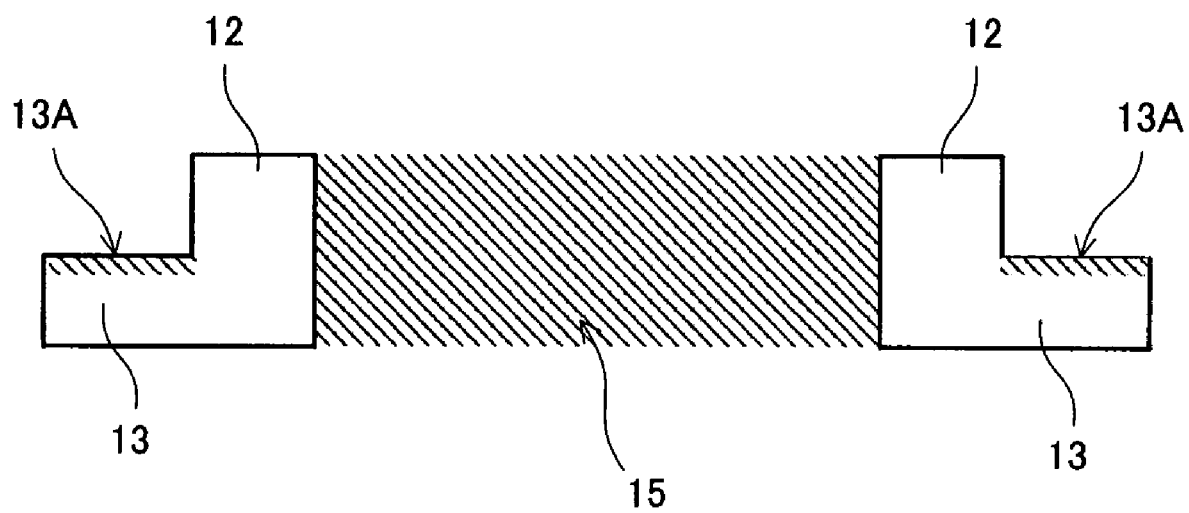
FIG. 10 is a sectional view of the relevant portion of FIG. 9, taken in a plane shown by the arrows Y-Y in that figure.

Moreover, as shown in FIGS. 8 through 10, a flange 13 and a plate 14 which extends in the direction of the exhausted air (refer to the black arrow sign 111 in FIG. 4) are formed on the outer side of the frame 12. The flange 13 is a member which contacts against the end portion of the insertion frame 22 in the installed state in which the frame 12 of the lamp unit 10 is engaged to the insertion frame 22 of the lamp unit housing unit 20 so that the lamp unit 10 is installed to the lamp unit housing unit 20. And the plate 14 is a member which has an end edge portion 14A. This plate 14 is a member which, in the installed state, contacts against the aperture line 22A of the insertion frame 22 in the engagement direction, and whose end edge portion 14A contacts against the installation surface 23 in the exhaust direction.

The frame 12 and the insertion frame 22 are formed of the following sizes. The length of the side of the frame 12 along its shorter (transverse) direction is the same as the length of the aperture line 22A of the insertion frame 22 (refer to FIGS. 6 and 9). Moreover, the length of the side of the frame 12 along its longer (longitudinal) direction is the same as the length of the insertion frame 22 from its aperture line 22A to its side which faces towards the aperture line 22A (refer to FIGS. 6 and 9). Furthermore, the height of the insertion frame 22 from the surface of the installation surface 23, and the height of the frame 12 from the surface 13A of the flange 13, are the same (refer to FIGS. 5, 7, 8, and 10).

It should be understood that the flange 13 corresponds to the "edge" of the Claims. Moreover, the exhaust aperture 15 corresponds to the "first exhaust aperture" of the Claims. Furthermore, the exhaust aperture 21 corresponds to the "second exhaust aperture" of the Claims.

Figure 11:
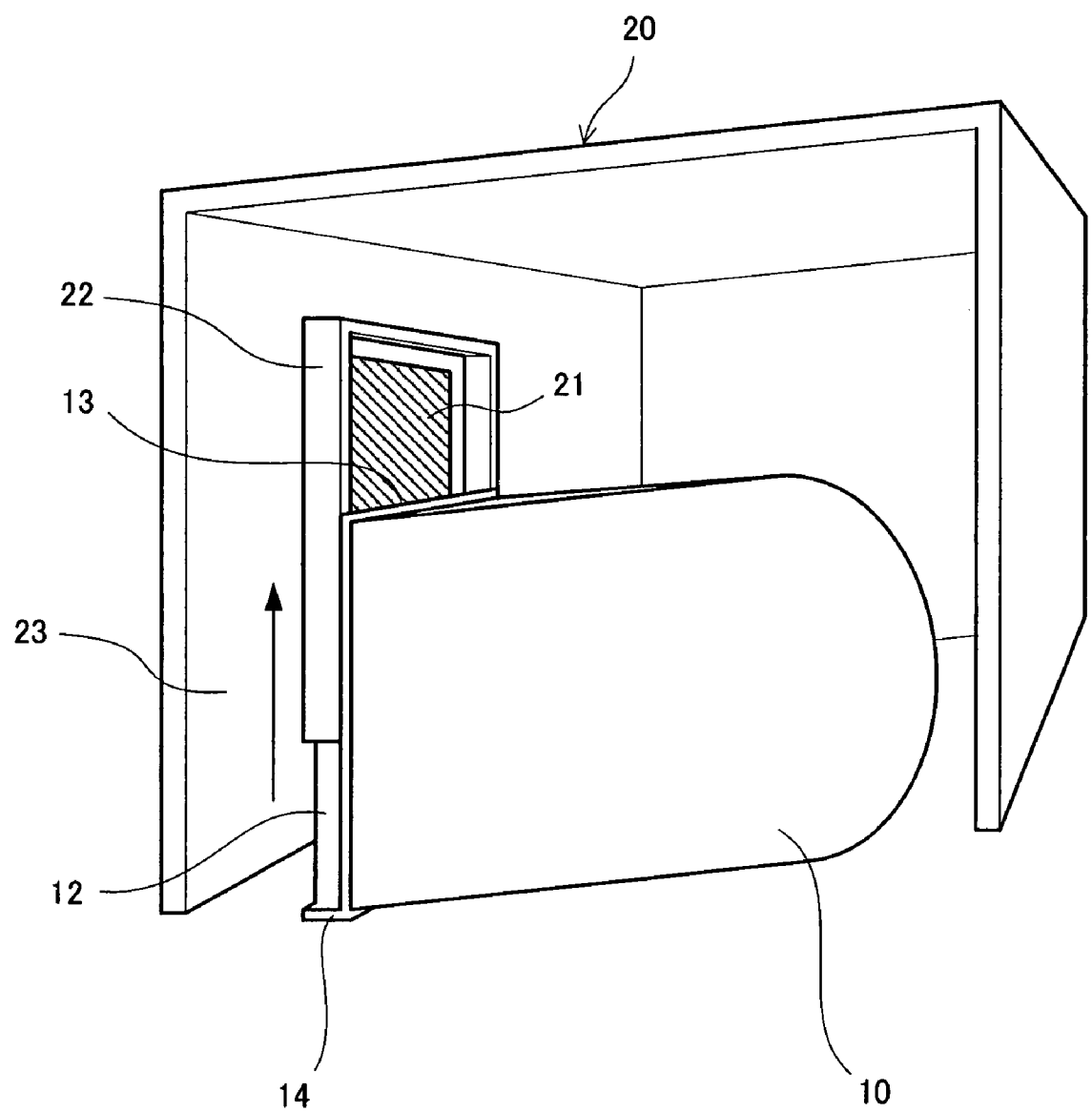
FIG. 11 is a figure showing the general appearance of the lamp unit while it is being mounted to the lamp unit housing unit.
Figure 12:
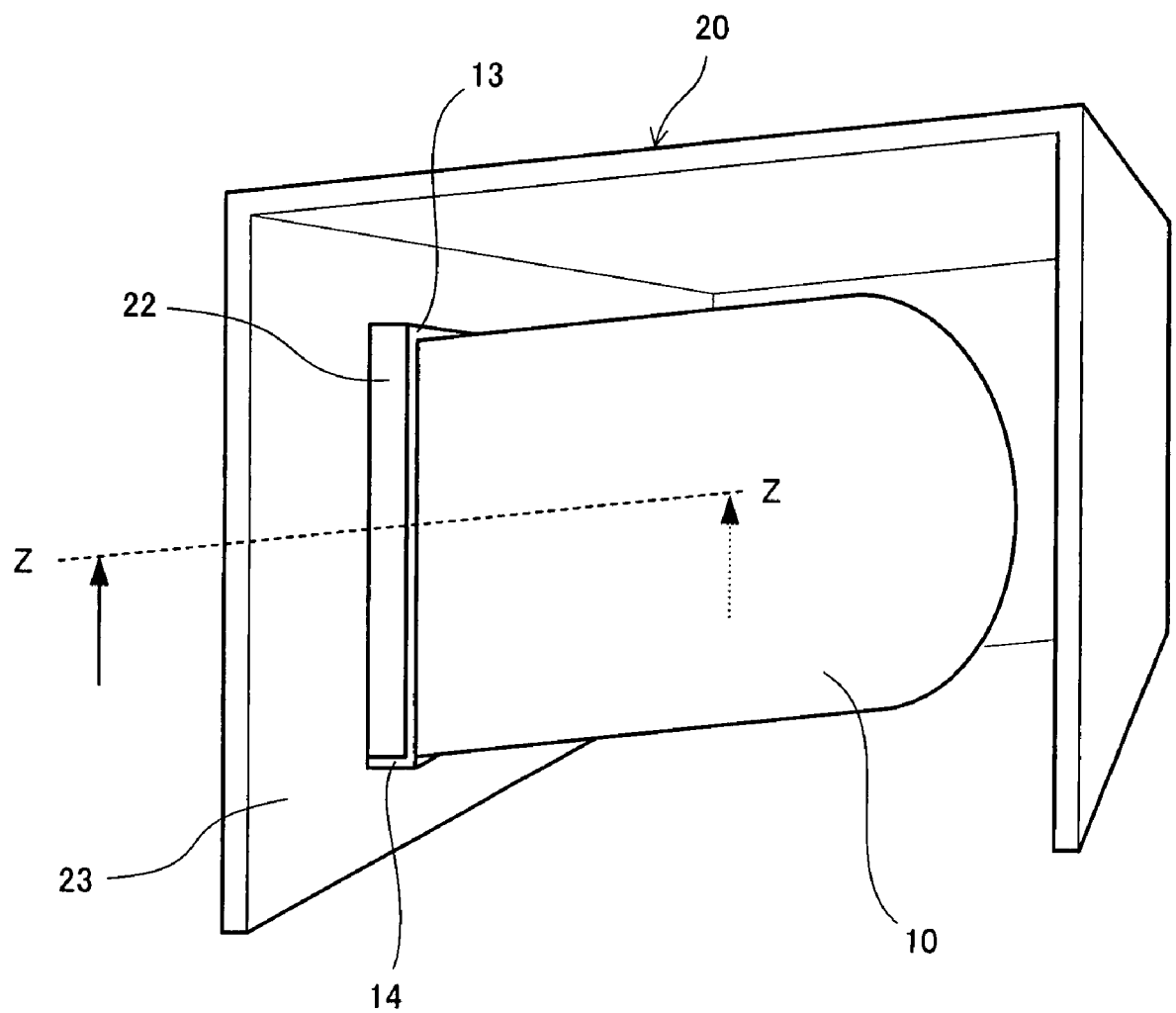
FIG. 12 is a figure showing the general appearance of the lamp unit when it has been mounted to the lamp unit housing unit.

FIG. 11 is a figure showing the general appearance of the lamp unit 10 while it is being mounted to the lamp unit housing unit 20. And FIG. 12 is a figure showing the general appearance of the lamp unit 10 when it has been mounted to the lamp unit housing unit 20. Moreover, FIG. 13 is a sectional view of the relevant portion of this projector which is an embodiment of the present invention, taken in a plane shown by the arrows Z-Z in FIG. 12.

When the frame 12 of the lamp unit 10 is engaged to the insertion frame 22 in the engagement direction (the direction shown by the arrow sign in FIG. 11), the lamp unit 10 is installed to the lamp unit housing unit 20 as shown in FIG. 12.

Figure 13:
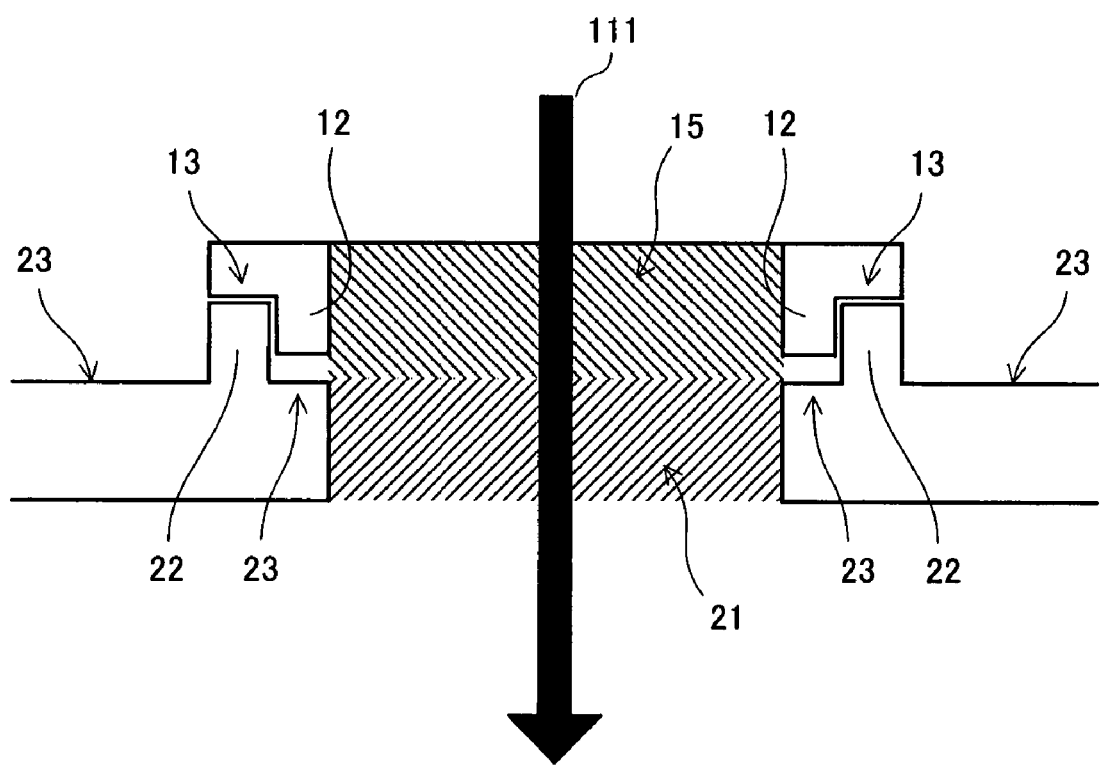
FIG. 13 is a sectional view of the relevant portion of this projector which is an embodiment of the present invention, taken in a plane shown by the arrows Z-Z in FIG. 12.

When the lamp unit 10 is being installed to the lamp unit housing unit 20, the frame 12 contacts against the installation surface 23 and the insertion frame 22, as shown in FIG. 13. Furthermore, the flange 13 contacts against the end portion of the insertion frame 22 in the exhaust direction. By contacting the flange 13 and the end portion of the insertion frame 22 together, it is possible to prevent leakage of air at high temperature out from a gap between the frame 12 of the lamp unit 10 and the insertion frame 22 of the lamp unit housing unit 20.

Furthermore, when the lamp unit 10 is being installed to the lamp unit housing unit 20, the end edge portion 14A of the plate 14 contacts in the engagement direction against the aperture line 22A of the insertion frame 22 of the lamp unit housing unit 20. Moreover, the end edge portion 14A of the plate 14 contacts in the exhaust direction against the installation surface 23 of the insertion frame 22 (refer to FIGS. 6, 9, and 12). Due to this, it is possible to prevent leakage of air at high temperature in the downwards direction in FIG. 12.

Due to the above, it is possible to prevent air at high temperature from leaking out from a gap between the frame 12 of the lamp unit 10 and the insertion frame 22 of the lamp unit housing unit 20. Because of this, there is no decrease in the light emission efficiency of the lamp 18. Moreover, it is also possible to prevent shortening of the life of the lamp 18 due to excessive temperature. Furthermore, there is no question of the lamp door 85 softening and deforming due to high temperatures. Accordingly, it is possible to anticipate that the reliability of the device as a whole may be enhanced.

It should be understood that the black arrow sign 111 indicates the direction of the exhaust (refer to the black arrow sign 111 in FIG. 4).

Furthermore, the following variant embodiments of the above described embodiment of the present invention may be employed.

A First Variant Embodiment

Figure 14:
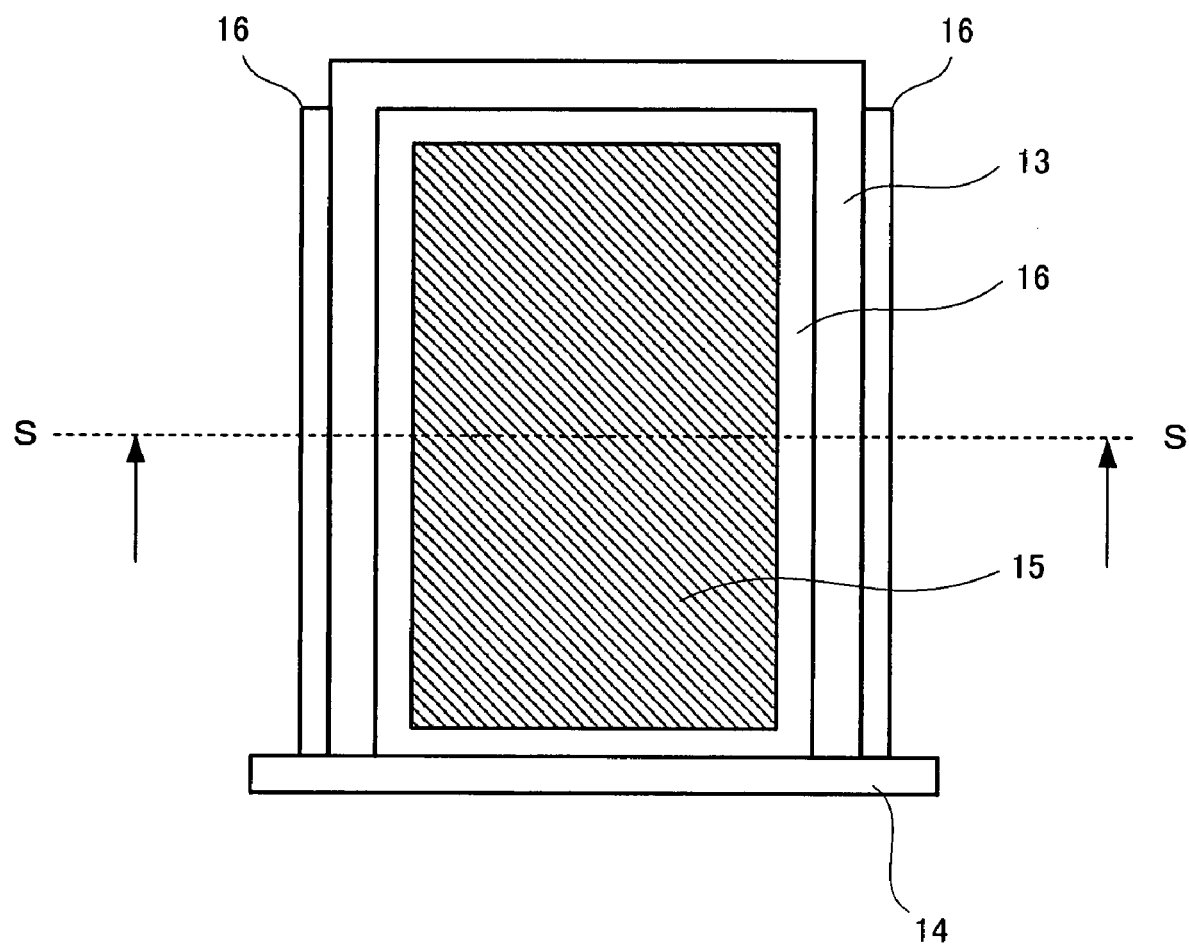
FIG. 14 is an elevation view of the portion, of a projector which is a first variant embodiment of the present invention, where the frame of the lamp unit is formed.

FIG. 14 is an elevation view of the portion, of a projector which is a first variant embodiment of the present invention, where the frame of the lamp unit is formed. And FIG. 15 is a sectional view of a relevant portion of the projector of FIG. 14, taken in a plane shown by the arrows S-S in that figure.

Figure 15:
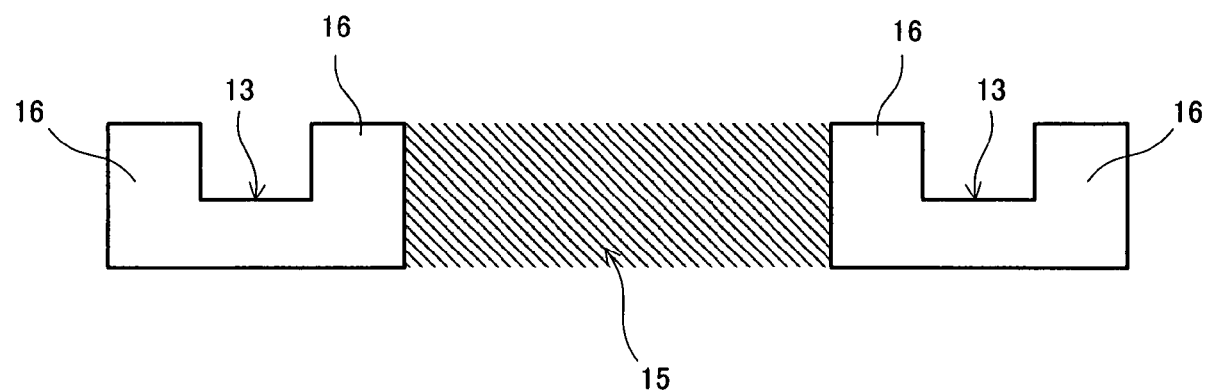
FIG. 15 is a sectional view of the relevant portion of the projector of FIG. 14, taken in a plane shown by the arrows S-S in that figure.

As shown in FIGS. 14 and 15, the frame 16 of the lamp unit 10 engages together the frame 16 and the insertion frame 22 of the lamp unit housing unit 20, and, in the installed state in which the lamp unit 10 is installed to the lamp unit housing unit 20, also is made in a shape in which it can sandwich the insertion frame 22 from the two opposite sides thereof.

Figure 16:
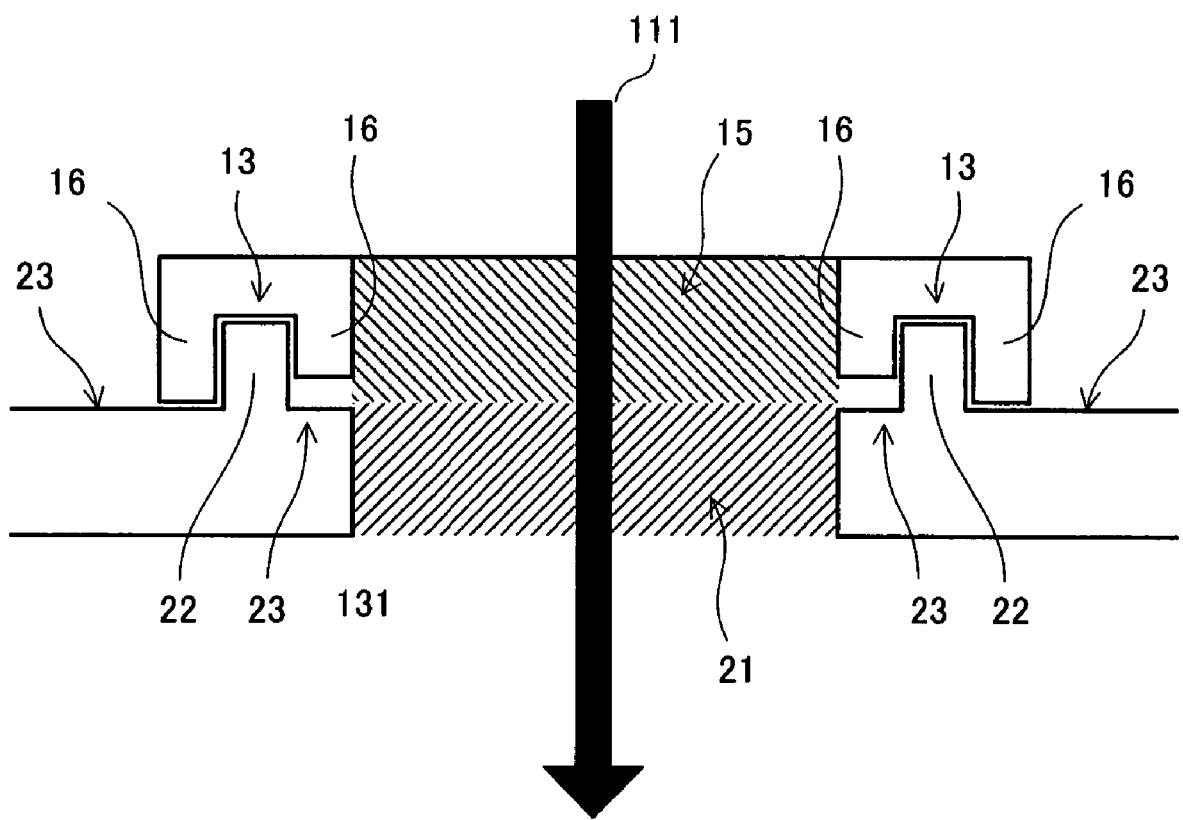
FIG. 16 is a sectional view of the relevant portion of this projector which is the first variant embodiment of the present invention, taken in a plane shown by the arrows Z-Z in FIG. 12.

FIG. 16 is a sectional view of the relevant portion of this projector which is the first variant embodiment of the present invention, taken in a plane shown by the arrows Z-Z in FIG. 12. In FIG. 16, the state is shown in which the lamp unit is installed to the lamp unit housing unit.

When the lamp unit 10 is installed in the lamp unit housing unit 20, the frame 16 contacts against the installation surface 23 and the insertion frame 22. Furthermore, the flange 13 contacts against the end portion of the insertion frame 22 in the exhaust direction. Thus, when the lamp unit 10 is installed to the lamp unit housing unit 20, the frame 16 sandwiches the insertion frame 22 from both its opposite sides. Due to this, the frame 16 and the insertion frame 22 are solidly sealed together. And, because of this, it becomes very difficult for air at high temperature to enter into and pass through this contacting together portion.

Due to the above, it is possible to prevent air at high temperature from leaking out from a gap between the frame 16 of the lamp unit 10 and the insertion frame 22 of the lamp unit housing unit 20, by yet a higher level.

It should be understood that the black arrow sign 111 in FIG. 16 indicates the direction of the exhaust, in the same manner as does the corresponding arrow sign in FIG. 13 (refer to the black arrow sign 111 in FIG. 4).

A Second Variant Embodiment

A second variant embodiment of the present invention is one in which a modification is made to the structure of the first variant embodiment described above.

Figure 17:
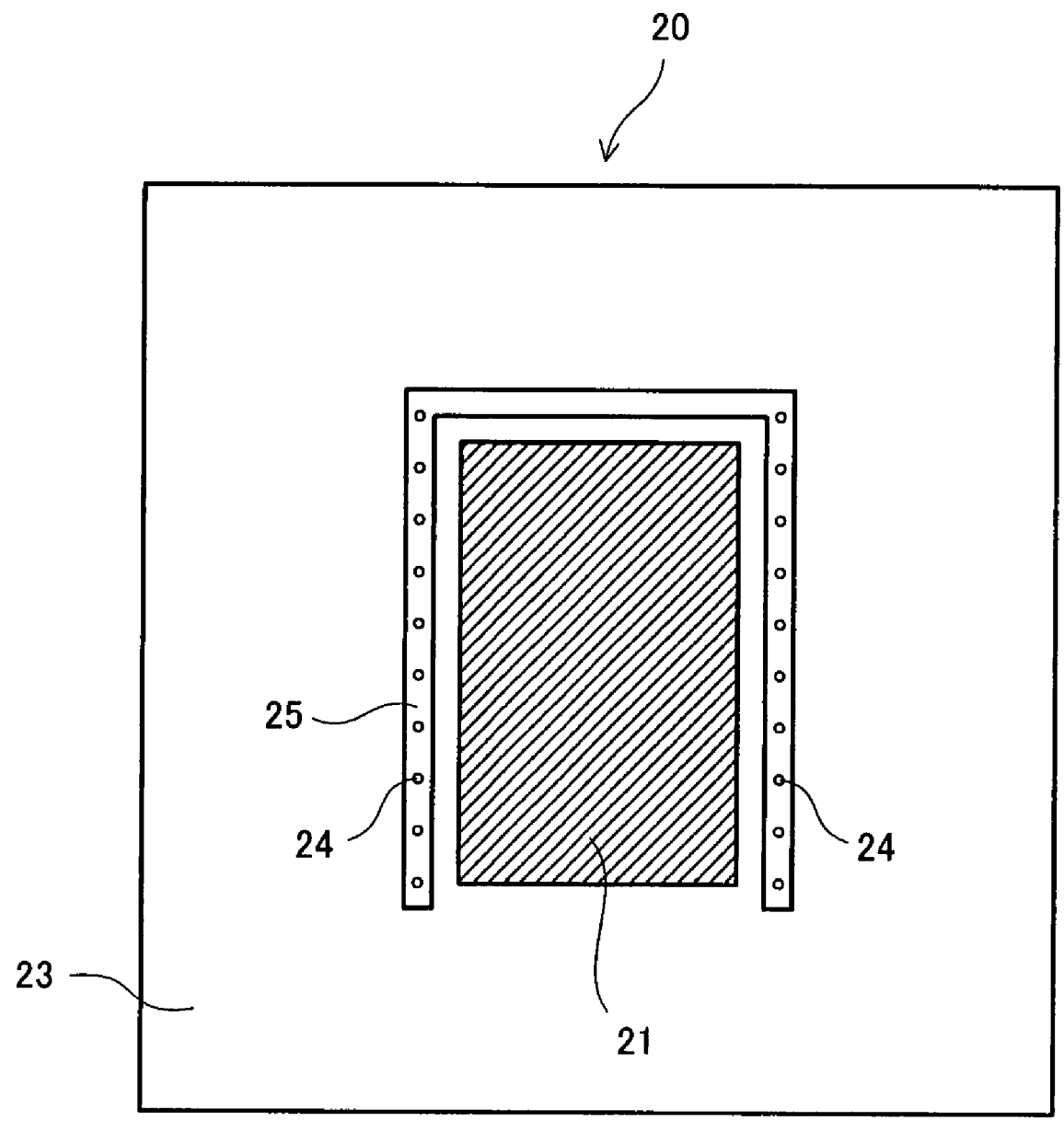
FIG. 17 is an elevation view of the portion, of a projector which is a second variant embodiment of the present invention, where the frame of the lamp unit is formed.
Figure 18:
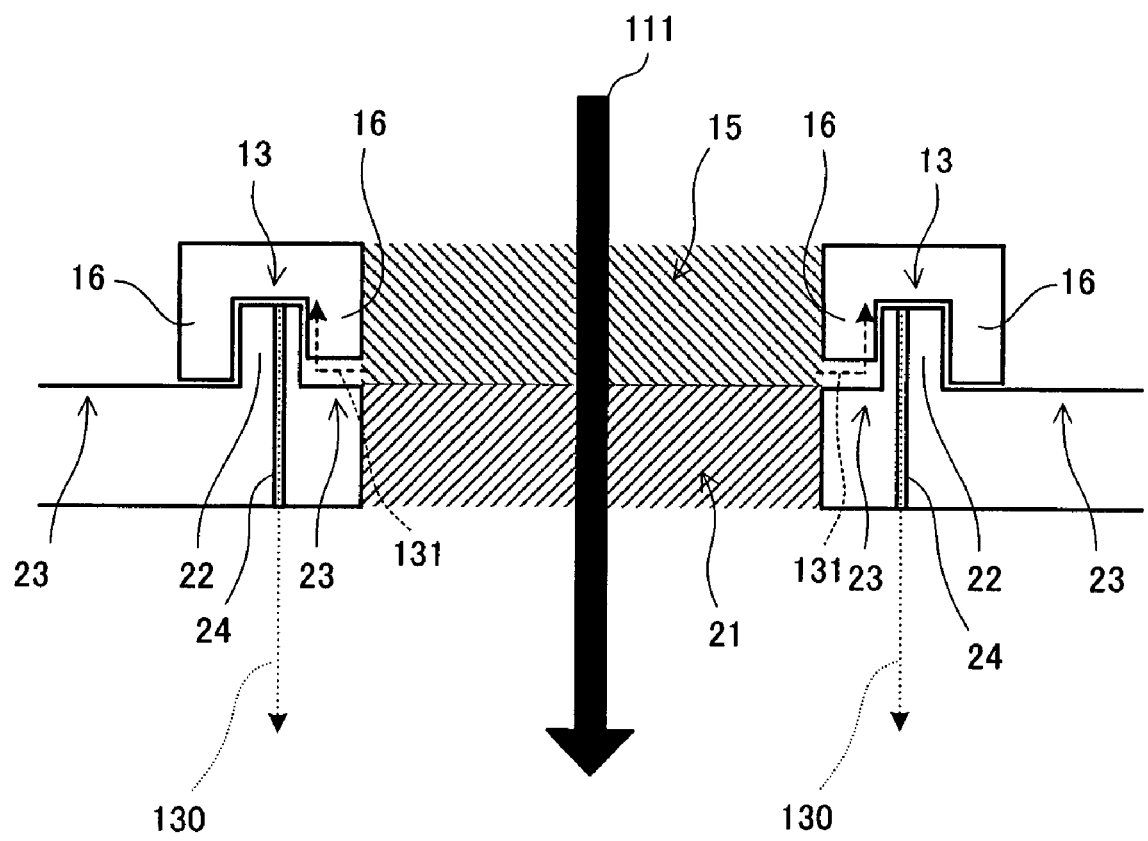
FIG. 18 is a sectional view of the relevant portion of this projector which is a second variant embodiment of the present invention, taken in a plane shown by the arrows Z-Z in FIG. 12.

FIG. 17 is an elevation view of the portion, of the projector which is a second variant embodiment of the present invention, where the frame of the lamp unit is formed. And FIG. 18 is a sectional view of the relevant portion of this projector which is a second variant embodiment of the present invention, taken in a plane shown by the arrows Z-Z in FIG. 12. In FIG. 18 the state is shown in which the lamp unit is installed to the lamp unit housing unit, just as in FIG. 16.

In this second variant embodiment, a plurality of vent holes 24 are formed in the insertion frame 25 of the lamp unit housing unit 20, leading in the exhaust direction. In this case, even supposing that air at high temperature should undesirably leak around the contacting portion between the frame 16 of the lamp unit 10 and the insertion frame 22 of the lamp unit housing unit 20 (as shown by the arrow signs 131 in FIG. 18), this air at high temperature is discharged to the exterior of the lamp housing unit 20 via the vent holes 24 (refer to the arrow signs 130 in FIG. 18). Due to this, it is possible to prevent this air at high temperature from flowing into the interior of the lamp unit housing unit 20, which would be undesirable.

According to the above, it is possible to prevent air at high temperature from entering around the contacting portion and escaping into the interior of the lamp unit housing unit 20. Thus, it is possible to prevent air at high temperature from leaking through a gap between the frame 16 of the lamp unit 10 and the insertion frame 22 of the lamp unit housing unit 20.

It should be understood that the black arrow sign 111 in FIG. 18 indicates the direction of the exhaust, in the same manner as does the corresponding arrow sign in FIGS. 13 and 16 (refer to the black arrow sign 111 in FIG. 4).

What is claimed is:

1. A projector, comprising:
   a lamp unit which constitutes a lamp, and a frame which is formed around the periphery of a first exhaust aperture of said lamp unit for exhausting air which has been taken into the interior of the lamp unit and has passed said lamp; and
   a lamp unit housing unit, provided within a chassis of said projector, which constitutes a partitioned-off housing space within said chassis and comprises an installation surface upon its inner wall for installing said lamp unit;
   wherein:
   said lamp unit housing unit comprises a substantially U-shaped insertion frame which is formed around the periphery of a second exhaust aperture provided upon said installation surface, for exhausting said air entering through said first exhaust aperture when said lamp unit is installed;
   said lamp unit comprises an edge and a plate on the outside of said frame;
   said edge is a member which contacts against the end portion of said insertion frame of said lamp unit housing unit in the exhaust direction, in the installed state in which said lamp unit is installed to said lamp unit housing unit by engaging said frame to said insertion frame from both ends of the U-shape of said insertion frame; and
   said plate is a member which, in said installed state, contacts in said exhaust direction with its end edge portion against said installation surface formed upon said insertion frame, and moreover, in said installed state, contacts in the engagement direction with its end edge portion against the aperture line which connects said both ends of said insertion frame.

2. A projector as described in claim 1, wherein said frame of said lamp unit has a shape such that, in said installed state, said frame sandwiches the U-shape of said insertion frame from opposite sides thereof.

3. A projector as described in claim 2, wherein said insertion frame of said lamp unit housing unit is formed with a plurality of vent holes leading in said exhaust direction.

\* \* \* \* \*